(No Model.)
H. W. LIBBEY.
ELECTRIC BICYCLE.
No. 596,272. Patented Dec. 28, 1897.
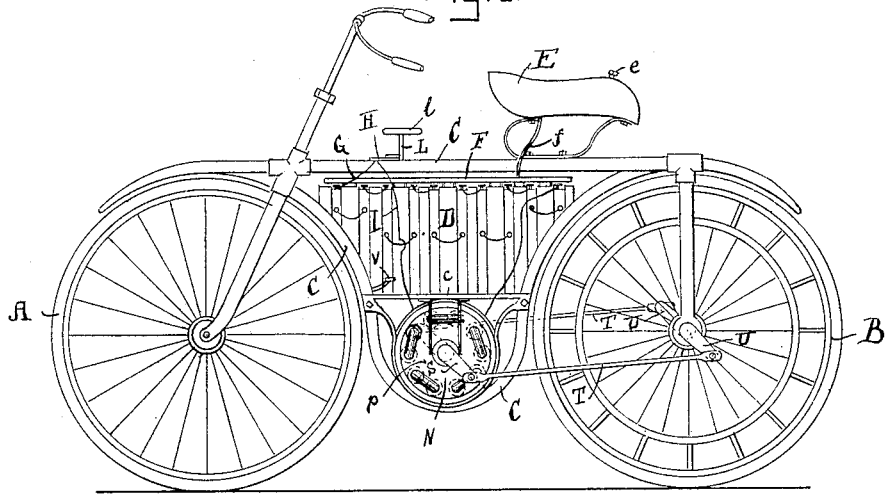
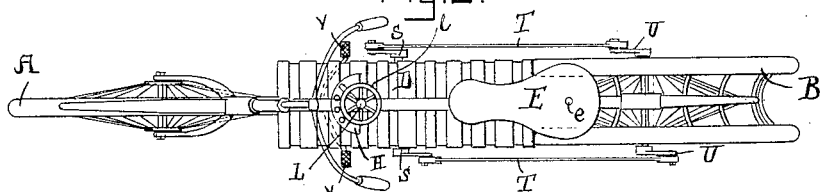
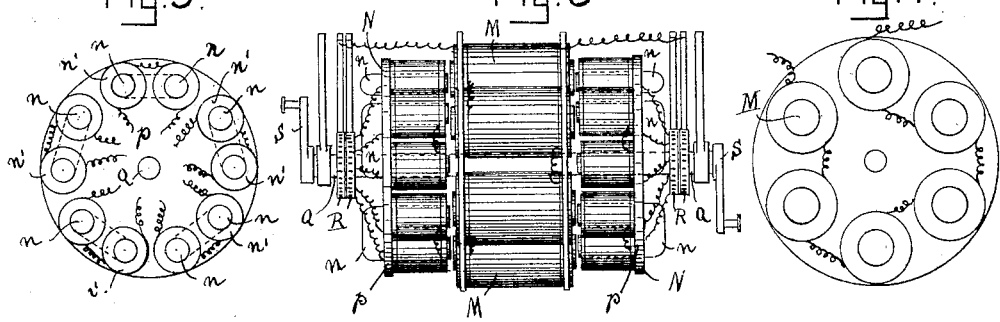
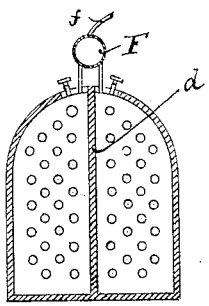
Witnesses.
Winifred T. Kerwin
Laura E. Hayward
Inventor.
Hosea W. Libbey
by Edwin Plante
attorney.

UNITED STATES PATENT OFFICE.

HOSEA W. LIBBEY, OF BOSTON, MASSACHUSETTS.

ELECTRIC BICYCLE.

SPECIFICATION forming part of Letters Patent No. 596,272, dated December 28, 1897.

Application filed November 8, 1895. Serial No. 568,247. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Electric Bicycles, of which the following, taken in connection with the accompanying drawings, is a specification.

The object of my invention is to produce a bicycle to be propelled by electricity generated by primary batteries and in motors therefor.

The invention consists of the novel features of the same, as will be hereinafter fully described, and pointed out in the claim.

Referring to the accompanying drawings, Figure 1 represents a side view of a bicycle embodying my invention. Fig. 2 is a plan or top view of same. Fig. 3 is a view of a double electric motor embodying my invention. Fig. 4 is a face view of the field-magnets. Fig. 5 is a face view of the armatures. Fig. 6 is a transverse section of the battery.

A represents the front steering-wheel, and B the rear driving-wheel, which is formed with a duplex tread, so that the vehicle will have three points of rest, whereby it will be maintained in a vertical position. I prefer to employ a wheel constructed according to a patent granted me and dated January 24, 1893, No. 490,391.

The front or steering wheel A is mounted in a fork and is operated by handles in the ordinary manner. The rear or driving wheel B is mounted in a fork that is preferably vertical, the front and rear forks being connected by a frame C, preferably of the loop pattern. Near the lower part of the loop two side pieces c are secured, upon which the battery D rests. This battery is preferably of similar construction to that shown in Letters Patent No. 536,689, issued to me the 2d day of April, 1895, only in this case the battery is made double—that is, with a central partition d. (See Fig. 6.) The batteries are supplied with the exciting fluid, such as diluted sulfuric acid, from a tank, reservoir, or hollow seat E, of saddle form, said fluid being conducted to the tube F, supplying the batteries by a flexible tube f. A small nozzle e is fitted at the rear of the seat, through which the tank or reservoir is filled with the exciting fluid. This nozzle is closed by a screw-cap. The negative wires G of the double battery are connected to an electric controller H, from which wires I run to the double motor J, and the positive elements are connected with the motor by wires K, the circuits being formed or broken by means of an upright rod L, fitted at its upper end with a wheel l in front of the seat E.

The motor D consists of a series of central straight permanent or field magnets M, the poles of which are arranged to alternate, and a series of armatures N on each side, each series consisting of a number of horseshoe-magnets n, passed through a plate p, but insulated therefrom, and coils n' on the ends of each of said magnets n, the plate p being secured to the driving-shaft Q, on which are secured commutators R R, one for each series of armatures, to the brushes of which commutators the wires from the spools of the armatures are connected and also the wires from the field or permanent magnets in the ordinary manner, so as to throw the current alternately through the north and south poles of the magnets of the armatures and the field-magnets, so that they will act to repel each other.

On the outer end of the shaft Q are secured cranks S, which by connecting-rods T are attached to cranks U on the rear driving-wheel B, so that as the armatures are rotated a corresponding movement is communicated to said driving-wheel.

On each side of the front portion of the frame is secured a foot-rest V, and the machine is fitted with a brake of the ordinary or any desired construction.

It will be seen that by this construction a very compact vehicle is produced, and by having the battery divided by a longitudinal portion d and any ordinary means for connecting and disconnecting the wires therewith the vehicle can be driven by either side or by both sides of said battery, as may be desired. Thus only one half of said battery may be used on level roads and both halves employed when climbing a hill, and by employing the rear double-treaded wheel for the driving-wheel a double amount of traction is obtained. Thus the vehicle is more easily propelled.

Instead of cranks and connecting-rods sprocket-wheels and chains might be employed in the usual manner to transmit motion from the motor to the driving-wheel.

As any ordinary means may be employed for connecting and disconnecting the wires with the batteries and also for transmitting the motion to the driving-wheel they are not shown, as they form no part of my invention.

What I claim is—

In a bicycle, the combination, with a frame, of an electric battery and motor thereon, said motor comprising a series of straight, parallel, central, permanent field-magnets having their poles arranged alternately with each other, a shaft having its axis concentric with the magnets, a plate upon the shaft on each side of the magnets, a series of armatures for each plate, each series of armatures consisting of a pair of horseshoe-magnets passed through and insulated from the plates, a coil upon the inner end of each of the horseshoe-magnets, a commutator for each series of armatures, the brush of each of which engages with the central magnets, and means for transmitting the motion of the motor to the driving-wheel, substantially as set forth.

In testimony whereof I have signed my name to this specification, in the presence of two subscribing witnesses, on this 17th day of October, A. D. 1895.

HOSEA W. LIBBEY.

Witnesses:
 CHAS. STEERE,
 EDWIN PLANTA.